Sept. 5, 1933.  M. DUITZ  1,925,656
METHOD OF SOLDERING AND SOLDERING APPARATUS
Filed April 11, 1930
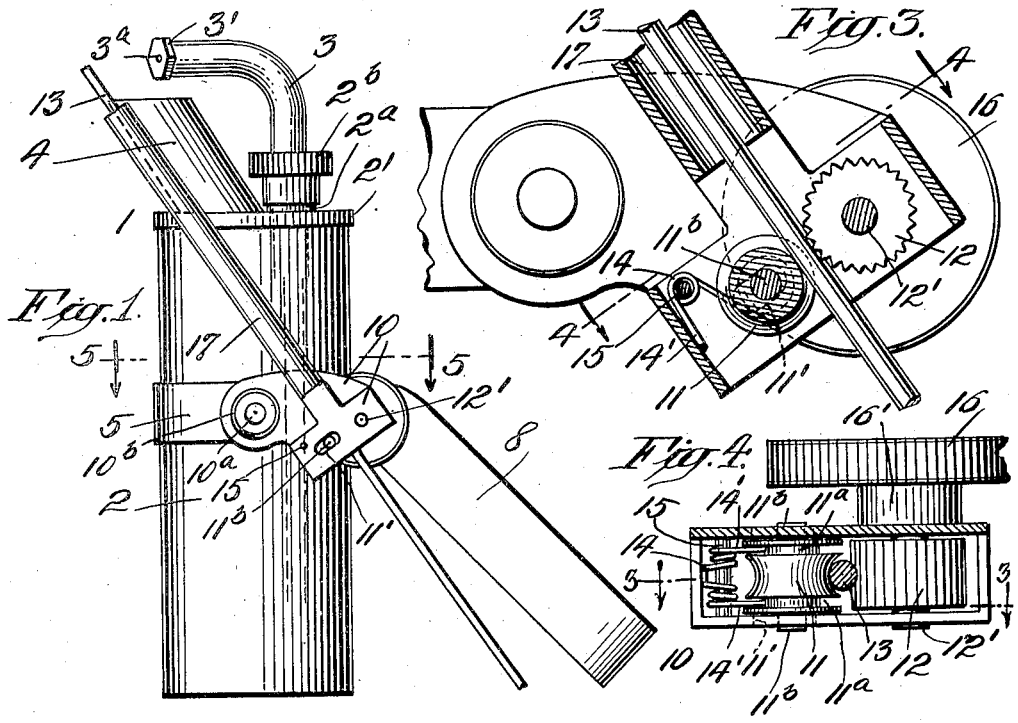
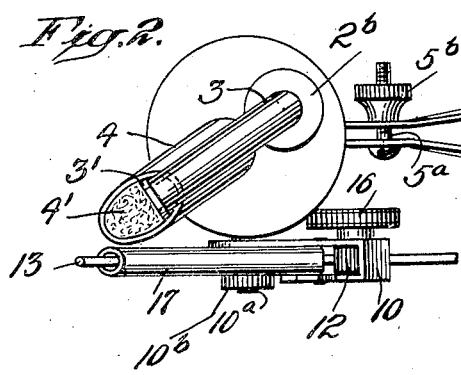
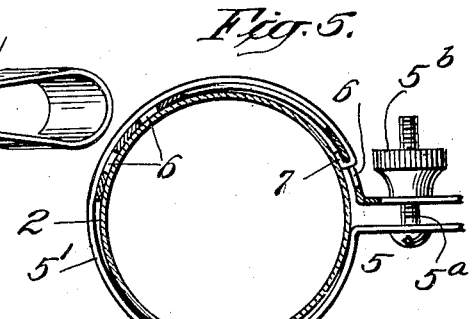
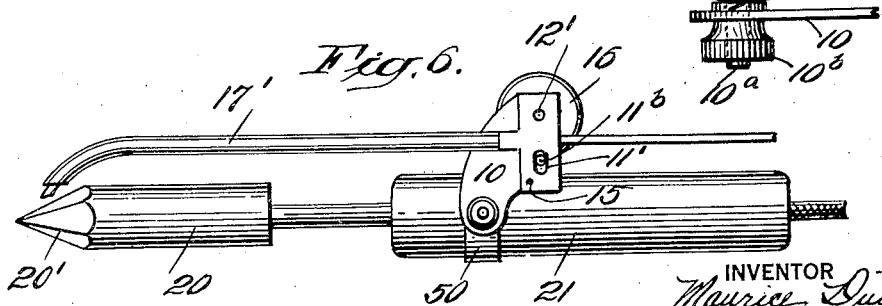
INVENTOR
Maurice Duitz
BY Randolph & O'Brien
His ATTORNEYS Patented Sept. 5, 1933

1,925,656

UNITED STATES PATENT OFFICE 1,925,656

METHOD OF SOLDERING AND SOLDERING APPARATUS

Maurice Duitz, Brooklyn, N. Y.

Application April 11, 1930. Serial No. 443,314

7 Claims. (Cl. 113—59)

This invention relates to improvements in methods of soldering and soldering apparatus.

One of the objects of my invention is to provide a simple and efficient method of soldering and a simple, efficient and easily-operable feed mechanism for soldering wire which is preferably applied to a soldering torch but may also be used with a soldering iron or the like.

Another object of my invention is to apply to a soldering flame-projecting torch a feed mechanism adapted to feed a soldering wire into proximity to said projected flame to cause an initial heating and softening without melting of the solder, whereby the solder may be subsequently spread on a joint to be soldered with much less heating of the joint wires to be soldered and a consequent saving of time in the making of a joint with said torch.

Another object of my invention is to provide a feed mechanism adjustable to receive and feed soldering wire or soldering strips of varying diameters or sizes and also to permit by a simple turning operation of a knurled knob the feeding of the same into proximity to a torch flame for initial heating or into contact with a soldering iron for the melting of the solder.

Another object of my invention is to enable a torch, soldering iron or the like to be held and the solder-feed mechanism to be operated with one hand, and to this end, I produce an apparatus of the type specified having a detachable handle arranged adjacent to a knurled knob, the handle preferably being adapted to be held by the fingers and the knurled-knob operating member being arranged in such adjacency thereto as to permit operation thereof by the thumb of the same hand of the user.

Still another object of my invention is to provide a solder-feed mechanism and handle of the type specified which will be capable of adjustment to fit torches, soldering irons or the like of varying diameters.

Still another object of my invention is to provide a detachable and preferably an adjustable clamping element for soldering torches, soldering irons and the like which will serve the double function of a handle clamp and a mounting member for a solder-feed mechanism, the handle preferably being so arranged in relation to the said operating mechanism as to enable facile operation of the latter by a finger of the same hand that grasps the handle.

Still another object of my invention is to provide a detachable and adjustable mounting clamp and a handle formed integrally and of the same strip of metal.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawing, in which:—

Fig. 1 is a side elevation of a soldering torch having my invention applied thereto;

Fig. 2 is a plan view of the device shown in Fig. 1;

Fig. 3 is a section on the line 3—3 of Fig. 4, looking in the direction of the arrow;

Fig. 4 is a section on the line 4—4 of Fig. 3, looking in the direction of the arrow;

Fig. 5 is a section on the line 5—5 of Fig. 1, looking in the direction of the arrow;

Fig. 6 is a view, in plan, of my solder-feeding mechanism as applied to an electric soldering iron.

Referring now to the drawing in which Figs. 1 to 5 illustrate a preferred embodiment of my invention, 1 indicates an alcohol soldering torch now purchasable on the market and comprising, as shown, a fuel container 2 for alcohol or the like divided into two compartments, one of which contains fuel for a relatively thin projected flame and the other contains fuel for a wick flame extending at an angle to the first-mentioned flame. Said container has, as shown, a top plate 2' provided with a projecting nipple 2ª preferably serving as a filling opening for that one of the fuel compartments of the container which feeds fuel to the projected flame. Mounted on this nipple 2ª is a knurled nut 2ᵇ by which is mounted on the container a burner-pipe 3 which, as shown, is bent substantially at right angles to the top plate and has at its tip 3' a fuel-burning opening 3ª which, in the form shown, is in vertical alignment with or over the top of an enlarged inclined wick-tube 4 provided at its upper end with an exposed wick 4'. The tube 3 extends within the container compartment and has a fuel feeding wick 3ᶜ which dips into the alcohol in said compartment.

Torches of the type hereinabove specified have heretofore been used in soldering but at present it is necessary to use the flame for a considerable period of time in order to heat the joints to be soldered to a red hot heat which will be sufficient to melt the solder in its cold condition when the same is applied. Such torches also are cumbersome because of the large diameters thereof and unhandy, it being necessary to use one hand for handling the torch and the other hand for applying the solder and maintaining the joint, and it is one of the objects of my invention to provide means for a torch of this character whereby such torches may be readily handled and operated and whereby the soldering operation by a torch of this character may be greatly facilitated, more efficiently performed in a much shorter period of time and the heating of the joint-wires and the application of the solder may be accomplished by the same hand without laying down the torch.

In the preferred form of my invention illustrated, I mount upon the torch container 2 a clamping band 5 which has a mounting element for the feed mechanism and also provide a handle for manipulating the torch and feed mechanism during the soldering operation. The clamping band 5 in the embodiment shown is formed integrally and of a single strip of sheet metal with a handle 6. As illustrated, said band 5 has a circular portion 5' adapted to encircle the container 2 and to be clamped thereto by the use of a screw 5ᵃ and knurled nut 5ᵇ. The ends of the band, as shown, are arranged to overlap and one of such overlapping ends is provided with a series of apertures 6 while the other end is provided with a hook 7 adapted to be inserted in any one of the said apertures 6, this arrangement enabling an adjustment of the circular band 5' to fit containers of varying diameters.

In the preferred embodiment of my invention shown, a handle 8 is formed between the ends of the strip which forms the clamping band and, as shown, comprises a downwardly-extending loop, the head portion of which adjacent to the circular band portion 5' is provided with a clamping screw 5ᵃ and nut 5ᵇ. In the form of my invention illustrated, I prefer to utilize the clamping band 5 for the mounting of a novel form and arrangement of feed mechanism which is capable of receiving and feeding soldering wire or soldering strips of varying diameters into proximity with the flames of the torch so as to procure an initial heating thereof and thus to enable the soldering of joints between the ends of electric wires and the like with less heat applied to such wires.

Thus, by feeding a soldering wire into proximity to the flames, my soldering wire is initially heated almost to the melting or flow point, and it is, therefore, unnecessary as in present practice to heat the ends of the wires to be joined to a red heat with the expenditure of considerable time, but by the use of my invention the said wires to be joined are heated to a much lesser degree and the initially softened soldering wire or strip, because of such initial heating flows freely over the joint wires to produce the soldered joint.

My invention, therefore, in general consists in applying to a torch of the type specified which has a flame, a soldering wire or element and feeding the same into such proximity to the flame as to procure an initial heating of the solder which may thereafter be spread on joint wires which are heated to a much lower degree.

My feed mechanism is also novel and comprises the mounting in a bracket 10 of feed rollers 11 and 12 respectively between which a soldering wire or strip 13 is fed and the use of simplified operating means for rotating said rollers to feed the wire or strip 13 into and through a guiding tube 17 which guides the same into proximity to the heating element or flames of the torch. As illustrated, the roller 11 has trunnions 11ᵇ mounted in slots 11' in the bracket and is forced toward the roller 12 by means of a spring 14 mounted, as shown, on a pin 15 and having its ends 14' fitting within grooves 11ᵃ at the sides of the roller 11 so as to normally force the grooved roller 11 into engagement with the tooth or knurled roller 12. As illustrated, the roller 12 has trunnions 12' mounted in fixed position in the bracket 10 and one side of these trunnions 12' extends outside the bracket and is provided with a hub or spacing element 16' formed integrally with a knurled operating wheel or knob 16.

The wire 13 fed, as aforesaid, through the rollers is guided by means of the guide tube 17 into proximity with the flames projected from the burner-openings of the torch.

In Fig. 6, I have shown my feed mechanism as applied to an electric soldering iron. In this Figure, 20 is an electric soldering iron of the conventional type having a handle 21 and I detachably mount on the handle of this electric soldering iron my improved and simplified feed mechanism which is in all respects similar to the feed mechanism hereinabove described except that a tube 17' guides the soldering rod into melting contact with the point 20' of the soldering iron 20 instead of into a softening proximity with the flames of a torch and consequently involves only the novel features of the feed mechanism per se. As shown, the feed mechanism is so mounted by means of a clamping band 50.

Having described my invention, I claim:

1. The method of soldering comprising the taking of a torch, projecting a flame therefrom, guiding and feeding a short section of one end of a strip of solder into a zone closely adjacent to said flame, preheating in said zone said short section into a condition close to the flow point of the solder while simultaneously heating by said flame the joint to be soldered to a point below red heat, and then melting said initially-softened solder by applying the same to the heated joint-parts.

2. Soldering apparatus embodying, in combination, a soldering element having a heating portion, a feed mechanism mounted thereon and comprising a bracket, a guide-tube connected with said bracket for guiding the end of a soldering wire into proximity with the heating portion of said soldering element, a pair of feed rollers mounted within said bracket, and an operating knob having a roughened surface and provided with an operative connection with said feed rollers for rotating the same to feed the soldering wire toward the soldering element, said feed mechanism and operating knob being so mounted and arranged as to permit holding of the soldering element and operation of the knob with one hand of the user.

3. Soldering apparatus embodying, in combination, a soldering element having a heating portion, a feed mechanism mounted thereon and comprising a bracket, a guide-tube connected with said bracket for guiding the end of a soldering wire into proximity with the heating portion of said soldering element, a pair of feed rollers, one of which is adjustably mounted to move in relation to the other to enable the feeding of soldering wires of varying diameters toward the soldering element, an operating knob having a roughened surface and provided with an operative connection with said feed rollers for rotating the same to feed soldering wire toward the said soldering element, a spring for pressing one of the rollers into contact with the other, said feed mechanism and operating knob being so mounted and arranged as to permit holding of the soldering element and operation of the knob with one hand of the user.

4. Soldering apparatus embodying, in combination, a soldering element having a heating portion, a feed mechanism mounted thereon and comprising a bracket, a guide-tube connected with said bracket for guiding the end of a soldering wire into proximity with the heating portion of said soldering element, a pair of feed rollers mounted in said bracket, an operating knob having a roughened surface and provided with an operative connection with one of said feed rollers for rotating the same to feed soldering wire toward the said heating portion, and means for mounting said feed mechanism on the soldering element including a handle arranged adjacent to said roughened surface, whereby the operating knob may be rotated and the device held by a single hand of the operator.

5. Soldering apparatus embodying, in combination, a soldering element having a heating portion, a feed mechanism mounted thereon and comprising a bracket, a guide-tube connected with said bracket for guiding the end of a soldering wire into proximity with the heating portion of said soldering element, a pair of feed rollers mounted in said bracket, an operating knob having a roughened surface and provided with an operative connection with one of said feed rollers for rotating the same to feed soldering wire toward the said heating portion, means for mounting said feed mechanism on the soldering element including a handle arranged adjacent to said roughened surface and comprising a detachable clamp formed integrally with said handle from a single strip of metal.

6. Soldering apparatus embodying, in combination, a soldering element having a heating portion, a feed mechanism mounted thereon and comprising a bracket, a guide-tube connected with said bracket for guiding the end of a soldering wire into proximity with the heating portion of said soldering element, a pair of feed rollers mounted in said bracket, an operating knob having a roughened surface and provided with an operative connection with one of said feed rollers for rotating the same to feed soldering wire toward the said heating portion, means for mounting said feed mechanism on the soldering element including a handle arranged adjacent to said roughened surface and comprising a detachable clamp formed integrally with said handle from a single strip of metal, said handle comprising a downwardly-extending open loop and a clamping screw and nut at the head of said handle to permit a tightening of the clamp on the heating element.

7. Soldering apparatus embodying, in combination, a soldering element having a heating portion, a feed mechanism mounted thereon and comprising a bracket, a guide-tube connected with said bracket for guiding the end of a soldering wire into proximity with the heating portion of said soldering element, a pair of feed rollers mounted in said bracket, an operating knob having a roughened surface and provided with an operative connection with one of said feed rollers for rotating the same to feed soldering wire toward the said heating portion, means for mounting said feed mechanism on the soldering element including a handle arranged adjacent to said roughened surface and comprising a detachable clamp formed integrally with said handle from a single strip of metal, and having adjustable ends, one of which is provided with a hook and the other with a plurality of hook-engaging apertures, whereby heating elements of varying diameters may be engaged by said clamp.

MAURICE DUITZ.